United States Patent [19]

Sasaki et al.

[11] 4,256,842

[45] Mar. 17, 1981

[54] HYDROPHILIC SEPARATING CARRIER AND PREPARATION THEREOF

[75] Inventors: Hiroo Sasaki; Katsuo Komiya; Yoshio Kato, all of Shin-nanyo, Japan

[73] Assignee: Toyo Soda Manufacturing Company, Limited, Yamaguchi, Japan

[21] Appl. No.: 128,130

[22] Filed: Mar. 7, 1980

Related U.S. Application Data

[62] Division of Ser. No. 45,663, Jun. 5, 1979.

[30] Foreign Application Priority Data

Jun. 8, 1978 [JP] Japan ................................ 53-68361

[51] Int. Cl.³ .............................................. C08J 9/36
[52] U.S. Cl. ............................... 521/53; 260/29.7 H; 521/56; 521/149; 521/150; 526/323.1; 526/323.2
[58] Field of Search ...................... 526/323.1, 323.2; 521/53, 149; 260/29.7 H

[56] References Cited

U.S. PATENT DOCUMENTS

| 3,681,269 | 8/1972 | Heitz | 521/149 |
| 3,878,175 | 4/1975 | Steckler | 521/149 |
| 3,997,482 | 12/1976 | Turkova et al. | 521/149 |
| 4,118,347 | 10/1978 | Ishiguro et al. | 521/149 |
| 4,133,942 | 1/1979 | Coupek et al. | 521/149 |

FOREIGN PATENT DOCUMENTS

53-90991 9/1978 Japan.
1512462 6/1978 United Kingdom.

*Primary Examiner*—Morton Foelak
*Attorney, Agent, or Firm*—Oblon, Fisher, Spivak, McClelland & Maier

[57] ABSTRACT

A hydrophilic separating carrier is a porous spherical gel having primary hydroxyl groups and is produced by an aqueous suspension homopolymerization of pentaerythritol dimethacrylate or an aqueous suspension copolymerization of pentaerythritol dimethacrylate and a methacrylate monomer having hydrophilic group and/or hydrophilic convertible group.

2 Claims, 6 Drawing Figures

HYDROPHILIC SEPARATING CARRIER AND PREPARATION THEREOF

This is a division of application Ser. No. 045,663, filed June 5, 1979, allowed.

BACKGROUND OF THE INVENTION

1. Field of the Invention

The present invention relates to a hydrophilic porous spherical separating carrier and its preparation. More particularly, it relates to a hydrophilic separating carrier suitable for separating important water soluble materials such as proteins and enzymes in an aqueous medium by a gel permeable effect in a high speed liquid chromatography.

2. Description of the Prior Arts

Heretofore, a gel filtering method has been known as one important method for separating and purifying water soluble materials.

Dextran gel and polyacrylamide gel have been widely used in a biochemical field etc., as a separating carrier. However, these gels have low mechanical strength whereby these gels could not be used as carriers for high speed liquid chromatography, disadvantageously.

Recently, various tests for producing hydrophilic gels having high mechanical strength by a crosslink polymerization of an acrylate monomer or a methacrylate monomer, have been studied.

However, it has not been attained to obtain a gel having high function for satisfying the following important functions.

(1) High mechanical strength
(2) No adsorption of measured materials
(3) High separation factor (resolution)

These functions can be obtained only when various desired physical and chemical properties required for an ideal gel are given.

Among the known gels, polyethyleneglycol dimethacrylate gels disclosed in Japanese Patent Publication No. 24512/1973 have an advantage of small adsorbing property but have disadvantages of low mechanical strength and small separation factor.

The gels obtained by copolymerizing hydroxyethyl methacrylate and ethyleneglycold methacrylate disclosed in Japanese Unexamined Patent Publication No. 64187/1973 have high adsorbing property and low mechanical strength.

The inventors have studied on various crosslinking agents in view of the consideration that the most important matter for producing ideal hydrophilic separating carriers is in a selection of a crosslinking agent.

As result, it has been found that the conventional crosslinking agent such as ethyleneglycoldimethacrylate is effective for increasing mechanical strength of a gel but has inferior hydrophilic property to give strong hydrophobic adsorption sites in the gel on the properties required for the crosslinked product.

SUMMARY OF THE INVENTION

It is an object of the present invention to provide a hydrophilic separating spherical gel having high mechanical strength, low adsorbing property and high separation factor and high hydrophilic property.

The foregoing and other objects of the present invention have been attained by providing a hydrophilic separating carrier which is a porous spherical gel having primary hydroxyl groups which is produced by an aqueous suspension homopolymerization of pentaerythritol dimethacrylate or an aqueous suspension copolymerization of pentaerythritol dimethacrylate and a methacrylate monomer having hydrophilic group and/or hydrophilic convertible group.

DETAILED DESCRIPTION OF THE PREFERRED EMBODIMENTS

The present invention has been attained by a finding of the fact that pentaerythritol dimethacrylate can imparts high mechanical strength as a crosslinking agent and can impart satisfactory hydrophilic property for overcoming the hydrophobic property of the crosslinked product by a hydrophilic treatment to the basic sites of primary hydroxyl groups on the surface of the gel. Accordingly, a gel having excellent low adsorbing property superior to that of the use of the known crosslinking agent can be obtained.

In accordance with the present invention, it is to provide a hydrophilic separating carrier obtained by a homopolymerization of pentaerythritol dimethacrylate; or a hydrophilic separating carrier obtained by a crosslinked copolymerization of hydrophilic methacrylate monomer with pentaerythritol dimethylacrylate as a crosslinking agent; or a hydrophilic separating carrier obtained by hydrolyzing said carrier in an aqueous solution of a base; or a hydrophilic separating carrier obtained by reacting a hydrophilic oxirane compound or its oligomer on primary hydroxyl groups of the carrier; and the preparations thereof.

The main reasons why pentaerythritol dimethacrylate is excellent as a crosslinking agent are as the following three reasons.

(1) A chain between two vinyl groups is short whereby a gel having high mechanical strength can be obtained.

(2) A hydrophilic oxirane compound can be reacted, in relatively mild condition, with two hydroxyl groups having remarkably high reactivity as primary hydroxyl group whereby the main chain and ester bonds of the polymer as its hydrophobic part can be covered by the hydrophilic bonding chain. Accordingly, hydrophobic adsorption sites are eliminated and even highly adsorbable materials such as proteins are not adsorbed and can be separated in their molecular sizes by the gel permeable effect.

(3) An aqueous suspension polymerization can be relatively easily performed even though two hydroxyl groups are present to be high hydrophilic property.

According to the studies by the inventors, a stability of the aqueous suspension polymerization is deteriorated depending upon increasing hydrophilic property of a monomer or a crosslinking agent and pentaerythritol dimethacrylate have nearly critical hydrophilic property.

The above-mentioned three reasons are important. For example, in view of (1), ethyleneglycol dimethacrylate as a well-known crosslinking agent is the optimum crosslinking agent. However, it has not highly reactive hydroxyl groups as the crosslinking agent used in the present invention whereby the treatment for imparting hydrophilic property can not be accomplished after forming the gel. Accordingly, strong hydrophobic adsorbing sites are remained.

The feature of the present invention will be further illustrated.

Pentaerythritol dimethacrylate can be simply produced by reacting pentaerythritol with methacrylic acid or its esters.

The first hydrophilic separating carrier of the present invention is a porous spherical gel obtained by an aqueous suspension homopolymerization of pentaerythritol or an aqueous suspension copolymerization of pentaerythritol dimethacrylate and methacrylate monomer. The porous spherical gel has primary hydroxyl group and has its physical properties of an average particle diameter of 1–500μ; an average diameter of pore diameter of 20 to 1500 Å and a retained water of 1 to 5 g/g.

The aqueous suspension homopolymerization or copolymerization for producing the carrier can be carried out by the known process. For example, a crosslinking agent, a monomer and a polymerization initiator are dissolved in an organic solvent and the mixture is heated at 40° C. to 90° C. preferably 50° C. to 80° C. and poured into an aqueous solution of a suspending agent with stirring to result a crosslink polymerization for a specific time.

A ratio of pentaerythritol dimethacrylate as a crosslinking agent to a comonomer is ranging from 100:0 to 5:95 preferably from 100:0 to 10:90.

When a ratio of pentaerythritol dimethacrylate to the comonomer is increased, a gel having higher hardness and higher mechanical strength is obtained. When only pentaerythritol dimethacrylate is polymerized, the gel having remarkably high hardness and mechanical strength can be obtained.

Methacrylate monomers used in the present invention are methacrylate monomers having hydrophilic group and/or hydrophilic convertible group which are copolymerizable with pentaerythritol dimethacrylate in an aqueous suspension polymerization.

Suitable methacrylate monomers having hydrophilic group include 2-hydroxyethyl methacrylate and polyethyleneglycol dimethacrylates having the formula $$CH_2=\overset{CH_3}{\underset{|}{C}}-COO(-CH_2-CH_2-O)_{\overline{n}}-OC-\overset{CH_3}{\underset{|}{C}}=CH_2$$
(3 ≦ n ≦ 15) (trimer or higher)

such as tetraethyleneglycol dimethacrylate and nonaethyleneglycol dimethacrylate. It is especially preferable to use 2-hydroxyethyl methacrylate.

Suitable methacrylate monomers having hydrophilic group include halohydrine methacrylates and oxirane group containing methacrylate monomers. It is especially preferable to use glycidyl methacrylate.

As the methacrylate monomers having hydrophilic group and hydrophilic convertible group, monomethacrylates of a lower polyhydric alcohol having 3 to 6 carbon atoms such as glycerine, pentaerythritol, trimethylolethane, and trimethylolpropane, have excess hydrophilic property whereby an aqueous suspension polymerization can not be performed. However, it is possible to use a $C_1$–$C_4$ saturated aliphatic esters thereof such as esters of acetic acid, propionic acid or butyric acid and monomethacrylates of polyethyleneglycol or polypropyleneglycol whose hydroxyl group is esterified with a lower saturated aliphatic acid which have the formula

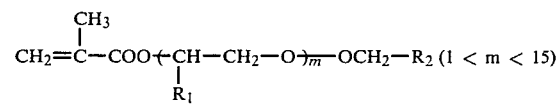

($R_1$ represents H or $CH_3$ and $R_2$ represents a $C_1$–$C_3$ saturated aliphatic hydrocarbon group). It is especially preferable to use mono or dipropionate or butyrate of pentaerythritol monomethacrylate.

The organic solvent should be to form at least two phases with water and should be inert solvents for dissolving the crosslinking agent and the monomer.

Suitable organic solvents include aromatic hydrocarbons, halohydrocarbons, alcohols having 4 or more carbon atoms, ketones having 4 or more carbon atoms, aliphatic acid esters and ethers having 5 or more carbon atoms.

It is especially preferable to use toluene, chlorobenzene, dichlorobutane, n-butanol, cyclohexanol, diisobutyl ketone, cyclohexanone, n-butyl acetate and diisopropyl ether.

An amount of the organic solvent is preferably ranging from 1 to 4 vol. times especially from 1.2 to 3 vol. times to a total of the crosslinking agent and the vinyl monomer.

The polymerization initiators can be conventional radical polymerization initiators. It is especially preferable to use benzoyl peroxide, azobisisobutyronitrile, t-butyl perpivalate etc.

An amount of the polymerization initiator is preferably ranging from 0.2 to 10 wt. % especially 0.5 to 5 wt. % to a total of the crosslinking agent and methacrylate monomer.

The conventional suspension stabilizers can be used. It is especially preferable to use polyvinyl alcohol (poval) and polyvinylpyrrolidone.

An amount of the suspension stabilizer is usually ranging from 1 to 10 wt. % to water.

The second hydrophilic separating carriers of the present invention are prepared by hydrolyzing a porous spherical gel having primary hydroxyl group obtained by an aqueous suspension homopolymerization of pentaerythritol dimethacrylate or an aqueous suspension copolymerization of pentaerythritol dimethacrylate and a methacrylate monomer having hydrophilic group and/or hydrophilic convertible group, in an aqueous solution of a base to convert its epoxy group, halogen atom or saturated aliphatic acid ester group into hydroxyl group.

The physical properties of the average particle diameter, the average pore diameter and the retained water of the second hydrophilic separating carrier are substantially the same with those of the first hydrophilic separating carrier except eliminating epoxy group, halogen atom and saturated aliphatic acid ester group.

In the hydrolysis of the porous spherical gel in the aqueous solution of a base for preparing the hydrophilic separating carrier, the first hydrophilic separating carrier is suspended in an aqueous solution of a base and the mixture is heated to a predetermined temperature with stirring at suitable degree for a predetermined time.

The aqueous solution of a base can be an aqueous solution of an alkali metal compound especially an aqueous solution of sodium hydroxide or potassium hydroxide.

The third hydrophilic separating carriers of the present invention, can be prepared by reacting a hydrophilic oxirane compound or its oligomer in an addition reaction, with primary hydroxyl group of the porous spherical gel obtained by an aqueous suspension homopolymerization of pentaerythritol dimethacrylate or an aqueous suspension copolymerization of pentaerythritol dimethacrylate and a methacrylate monomer having hydrophilic group and/or hydrophilic convertible group or a porous spherical gel obtained by hydrolyzing the gel in an aqueous solution of a base.

The third hydrophilic separating carrier has superior physical properties especially an improved hydrophilic property of its surface, an improved mechanical strength, an increased ratio of oxygen content in its elementary analysis, an increased absorption caused by ether bond in IR spectrum to those of the first and second hydrophilic separating carriers, however, the physical properties of the average particle diameter, the average pore diameter, and the retained water of the third hydrophilic separating carrier are substantially the same with those of the first and second hydrophilic separating carriers.

The effects of the hydrophilic treatment in the present invention are as follows.

(1) An improvement for lower adsorbing property resulted by eliminating hydrophobic adsorption sites.

(2) An increase of mechanical strength by crosslinking effect.

In the hydrophilic treatment for preparing the third hydrophilic separating carrier, an oxirane compound, a catalyst and a solvent are mixed with the first or second hydrophilic separating carrier and the mixture is stirred at a reaction temperature of from 0° to 200° C. preferably from room temperature to 120° C. for a desired time to react the hydrophilic oxirane compound or its oligomer with primary hydroxyl group of the gel in an addition reaction.

If necessary, excess water is added at the final stage of the reaction and the mixture is heated at higher than 50° C. for several hours in order to hydrolyze the remained oxirane ring or the other hydrolyzable group.

When epichlorohydrin is used as the oxirane compound, it is important to treat it with an aqueous solution of a base so as to convert chlorine atom into hydroxyl group.

Various methods can be employed for the hydrophilic treatment. The following is typical three methods.

First method is to react them in an aqueous solution of a base. The bases can be alkali metal hydroxides and carbonates and alkaline earth metal hydroxides and carbonates.

Second method is to react them in a polar organic solvent in the presence of a catalyst such as alkali metal hydroxides and carbonates and metal alcoholates. The polar organic solvents can be (1) amide type solvent such as dimethylformamide and N-methyl pyrrolidone; (2) dimethylsulfoxide and (3) ether type solvent such as dioxane, diethyleneglycol dimethyl ether.

Third method is to react them in the presence of Lewis acid as a catalyst.

Typical catalysts are boron fluoride, its ether complex and stannic tetrachloride. Suitable solvents include ether type solvents such as dioxane and diethyleneglycol dimethyl ether.

The hydrophilic oxirane compounds used in the present invention include epichlorohydrin, glycidol, butadienediepoxide and various glycidyl ethers of polyhydric alcohol.

Suitable glycidyl ethers of polyhydric alcohol include (1) mono-or di-glycidyl ethers of ethyleneglycol, propyleneglycol, butanediol or hexanediol; (2) mono-, di- or tri-glycidyl ethers of glycerol, erythritol, pentaerythritol, sorbitol, trimethylolethane or trimethylolpropane; (3) mono- or di- glycidyl ethers of diethyleneglycol and triethyleneglycol; (4) mono- or di- glycidyl ethers of propyleneglycol; and (5) mono- or di-polyglycidyl ethers of monosaccharide or oligosaccharide.

These glycidyl ethers can be produced by a known process using a polyhydric alcohol and epichlorohydrin. Typical glycidyl ethers are commercially available.

The oxirane compound can be a mixture of two or more compounds. When the molecular weight of the oxirane compound is too large, the inner volume of pores of the gel is remarkably reduced to deteriorate the separation factor (resolution) as the separating carrier. The molecular weight of the oxirane compound is usually less than 1000 preferably less than 500.

When a monooxirane compound is used in the present invention, only (1) the effect for lowering the adsorbing property among the effects of the hydrophilic treatment is attained. When the di- or tri- oxirane compound is used, both of the effect for lowering the adsorbing property and the effect for increasing the mechanical strength by a crosslink reaction can be attained.

The hydrophilic separating carrier of a porous spherical gel having primary hydroxyl group which is obtained by an aqueous suspension homopolymerization of pentaerythritol dimethacrylate or an aqueous suspension copolymerization of pentaerythritol dimethacrylate and a methacrylate monomer having hydrophilic group or hydrophilic convertible group; or a hydrophilic separating carrier obtained by hydrolyzing said separating carrier in an aqueous solution of a base; or a hydrophilic separating carrier obtaned by reacting a hydrophilic oxirane compound or its oligomer with primary hydroxyl group of said separating carrier in an addition reaction, has preferably a particle diameter of from 1 to 500$\mu$ especially from 5 to 200$\mu$ to be highly effective for various usages.

The average size diameter of pores of the porous spherical gel can be controlled in a range of from 10 Å to 2000 Å. As a liquid chromatography carrier, the porous spherical gel having an average size diameter of pores of from 20 Å to 1500 Å is especially important.

The hydrophilic separating carriers obtained by the hydrophilic treatment among the separating carriers of the present invention have low adsorbing property and high mechanical strength and are remarkably excellent as a gel permeation carrier. They can be used in the fields for the conventional dextran gel and agarose gel especially in the fields of separation and analysis of biochemical materials such as proteins and enzymes.

The porous spherical gels which are treated or not treated by the hydrophilic treatment, have excellent characteristics as partition chromatography carriers. Such gels have highly reactive hydroxyl group whereby various gels having special functions as dextran gel and agarose gel can be obtained by modifying the reactive hydroxyl group. In such application, the gels have advantages of high mechanical strength which could not provide for the dextran gel and agarose gel.

The present invention will be further illustrated by certain examples and references which are provided for purposes of illustration only and are not intended to be limiting the present invention.

Reference: (Preparation of pentaerythritol dimethacrylate)

In a glass flask equipped with a stirrer and a thermostat, 200 wt. parts of pentaerythritol, 1000 wt. parts of dimethylformamide and 2 wt. parts of potassium hydroxide were charged and the mixture was stirred at 65° C. and 400 wt. parts of glycidyl methacrylate was added dropwise during 1 hour. The mixture was further stirred at the same temperature for 40 minutes and then, 1.5 wt. part of glacial acetic acid was added and the mixture was cooled to lower than 60° C. The solvent of dimethylformamide and the unreacted glycidyl methacrylate were distilled off in a reduced pressure by a rotary evaporator. The residual material was admixed with 3000 wt. parts of ethyl acetate and an insoluble material was separated by a filtration.

The ethyl acetate solution was extracted and washed with 1000 wt. parts of 15% aqueous solution of sodium chloride to remove water soluble components. The ethyl acetate solution was dehydrated over anhydrous sodium sulfate and then, ethyl acetate was distilled off in a reduced pressure. The resulting pentaerythritol dimethacrylate was analyzed by a high speed liquid chromatography under the following condition. Result is shown in Fig. 1.

Apparatus: HLC 802 UR (manufactured by Toyo Soda Ind. Co.)
Column: TSK GEL G-2000H inner diameter 7.5 mm × length 600 mm two columns
Eluent: tetrahydrofuran
Flow rate: 1 ml/min.
Temperature in measurement: room temperature
Detector: Differential refractometer According to the analysis, the product contained about 10% of pentaerythritol trimethacrylate and small amount of glycidyl methacrylate as impurities. The IR spectrum of the product was measured and shows in FIG. 2.

In the examples, the resulting pentaerythritol dimethacrylate was used.

EXAMPLE 1

In a reactor equipped with a stirrer and a thermostat, 4000 wt. parts of water and 200 wt. parts of polyvinyl alcohol (poval) were charged and the mixture was stirred at 70° C. to dissolve polyvinyl alcohol.

In the aqueous solution of polyvinyl alcohol, a mixture of 400 wt. parts of pentaerythritol dimethacrylate, 800 wt. parts of n-butanol and 8 wt. parts of benzoyl peroxide was admixed to carry out a crosslink polymerization for 16 hours. After the reaction, the resulting suspension was filtered through a glass filter and washed with hot water and further washed with acetone to obtain fine spherical gel. IR spectrum of the dried gel is shown in FIG. 3.

The resulting gel was seived to collect the particles having diameter of $8\mu$–$12\mu$. The gel was packed under pressure in a stainless steel column having an inner diameter of 7.5 mm and a length of 60 cm.

A limiting separable molecular weight measured by using a dextran standard sample (manufactured by Pharmacia Co.) was about $10^5$. The condition for the measurement is as follows.

Apparatus: HLC 802 UR (manufactured by Toyo Soda Ind. Co.)
Medium: Distilled water
Flow rate: 1.0 ml/min.
Amount of sample injected: 100 ul of 0.4% aqueous solution
Detector: RI detector
Temperature: room temperature Relation of pressure loss to flow rate was studied by varying the flow rate. As the result, the pressure loss was increased in proportional to the flow rate until 300 kg/cm$^2$. The mechanical strength of the gel was remarkably high.

A polyethyleneglycol standard sample was eluted with water. As the result, the elution of polyethyleneglycol was not always in orders of molecular weights because of adsorbing property. However, the result was superior to those of the known hydrophilic separating carriers.

A protein standard sample was eluted with a phosphoric acid buffer solution. The result is as follows.

| Proteins | Elution % |
| --- | --- |
| γ-globulin | 15 |
| allumin (blood serum) | 55 |
| β-lactoglobulin | 30 |
| myoglobin | 35 |
| cytochrome C | 3 |

The condition for measurement is as follows.

| Condition for measurement of the polyethyleneglycol standard sample | |
| --- | --- |
| Apparatus: | HCL 802 UR |
| Column: | inner diameter 7.5 mm × length 600 mm |
| Eluent: | water |
| Flow rate: | 1.0 ml/min. |
| Temperature: | room temperature |
| Detector: | Differential refractometer |

| Condition for measurement of protein standard sample | |
| --- | --- |
| Apparatus: | HLC 802 UR |
| Column: | inner diameter 7.5 mm × length 600 mm two columns |
| Eluent: | phosphoric acid buffer solution (pH 6.8) |
| Flow rate: | 1.0 ml/min. |
| Temperature: | room temperature |
| Detector: | UV 280 nm |

In the following examples, the conditions for measurements of dextran, polyethyleneglycol and protein standard samples are the same as the above-mentioned conditions.

EXAMPLE 2

In accordance with the process of Example 1 except using 200 wt. parts of pentaerythritol dimethacrylate as the crosslinking agent and 200 wt. parts of 2-hydroxyethyl methacrylate as the comonomer, an aqueous suspension copolymerization and a post-treatment were carried out.

The product was seived to collect the gel having diameters of $20\mu$–$30\mu$.

In accordance with the process of Example 1, the gel was packed in the column and the limiting separable molecular weight was measured by using the dextran standard sample. It was about $10^4$.

When the protein standard sample was eluted by using the phosphoric acid buffer solution, the adsorbing property was slightly lower than that of the gel of Example 1.

| Protein | Elution % |
|---|---|
| γ-globulin | 30 |
| albumin (blood serum) | 63 |
| β-lactoglobulin | 38 |
| myoglobin | 45 |
| cytochrome C | 12 |

EXAMPLE 3

In accordance with the process of Example 1 except using 60 wt. parts of pentaerythritol dimethacrylate as the crosslinking agent, 340 wt. parts of glycidyl methacrylate as the comonomer and 600 wt. parts of monochlorobenzene as the solvent instead of n-butanol an aqueous suspension copolymerization and a post-treatment were carried out.

The residual epoxy group was measured to find 63% of epoxy group based on theoretic one.

The product was seived to collect the gel having diameters of 20μ–30μ.

In accordance with the process of Example 1, the gel was packed in the column and the limiting separable molecular weight was measured by using the dextran standard sample. It was about $10^6$.

Then, 100 wt. parts of the gel having diameters of 20μ–30μ collected by seiving was suspended in 500 wt. parts of 1 N-NaOH aqueous solution, and the mixture was stirred at 30° C. for 20 hours. The gel was washed with hot water. The residual epoxy group was not detected.

The gel was packed in the column and the protein standard sample was eluted by using the phosphoric acid buffer solution.

The result is as follows.

| Protein | Elution % |
|---|---|
| γ-globulin | 35 |
| albumin (blood serum) | 62 |
| β-lactoglobulin | 45 |
| myoglobin | 48 |
| cytochrome C | 28 |

EXAMPLE 4

In accordance with the process of Example 1 except using 150 wt. parts of pentaerythritol dimethacrylate as a crosslinking agent and 250 wt. parts of nonaethyleneglycol dimethacrylate (average molecular weight of 400 mixed polyethyleneglycol dimethacrylate) as a comonomer, an aqueous suspension copolymerization and a post-treatment were carried out.

The product was seived to collect the gel having diameters of 20μ–30μ.

In accordance with the process of Example 1, the gel was packed in the column and the limiting separable molecular weight was measured by using the dextran standard sample. It was about $10^4$.

The gel was packed in the column and the protein standard sample was eluted by using the phosphoric acid buffer solution. The result is as follows.

| Protein | Elution % |
|---|---|
| γ-globulin | 55 |
| albumin (blood serum) | 84 |
| β-lactoglobulin | 60 |
| myoglobin | 68 |
| cytochrome C | 45 |

EXAMPLE 5

In accordance with the process of Example 1 except using 50 wt. parts of pentaerythritol dimethacrylate as a crosslinking agent, 350 wt. parts of glycerol monomethacrylate monopropionate as a comonomer and 600 wt. parts of isoamyl alcohol as a solvent, an aqueous suspension copolymerization and a post-treatment were carried out.

The product was seived to collect the gel having diameters of 30μ–50μ. In 500 wt. parts of 3 N-NaOH aqueous solution, 100 wt. parts of the gel was suspended and stirred at 40° C. for 16 hours. The gel was filtered and washed with hot water. In accordance with the process of Example 1, the gel was packed in the column and the limiting separable molecular weight was measured by using dextran standard sample. It was about $5 \times 10^4$.

A polyethyleneglycol standard sample was eluted with water. As the result, the elution of polyethyleneglycol was always in orders of molecular weights. The fact shows low adsorbing property.

A protein standard sample was eluted with a phosphoric acid buffer solution. The result is as follows.

| Protein | Elution % |
|---|---|
| γ-globulin | 76 |
| albumin (blood serum) | 92 |
| β-lactoglobulin | 75 |
| myoglobin | 80 |
| cytochrome C | 55 |

EXAMPLE 6

The aqueous slurry of the gel having diameters of 8μ–12μ obtained in Example 1 was filtered through a glass filter to obtain a wet cake. In a glass reactor, 100 wt. part of the wet cake of the gel, 50 wt. parts of glycerol diglycidyl ether (Denacol EX-314 manufactured by Nagase Sangyo K.K.) and 200 wt. parts of 1 N-NaOH aqueous solution were charged and stirred at 30° C. for 16 Hours. The suspension was filtered through a glass filter and the gel was washed with hot water. IR spectrum of the resulting gel is shown in FIG. 4. The increase of absorption near 1100 $cm^{-1}$ was for ether bond resulted.

In accordance with the process of Example 1, the gel was packed in the column and separations of the dextran standard sample, the polyethyleneglycol standard sample and the protein standard sample were measured.

In accordance with the separation of the dextran standard sample with water, the limiting separable molecular weight was substantially the same.

The polyethyleneglycol standard sample was eluted with water. As the result, the elution of polyethyleneglycols was in orders of molecular weights. In comparison with the gel which was not treated by the hydrophilic treatment, remarkable reduction of the adsorbing property was found.

The protein standard sample was eluted with phosphoric acid buffer solution. As the result, the elution of the proteins was in orders of molecular weights without any adsorption. All of the sample was eluted. The result of the elution of the polyethyleneglycol standard sample is shown in FIG. 5.

The result of the elution of the protein standard sample is shown in FIG. 6.

EXAMPLE 7

The gel having diameters of $8\mu-12\mu$ obtained in Example 1 was washed with dioxane.

In a glass reactor, 100 wt. parts of the dioxane wetted cake of the gel, 600 wt. parts of dioxane, 50 wt. parts of ethyleneglycol monoglycidyl ether and 1 wt. part of boron fluoride etherate were charged and the mixture was stirred at 70° C. for 16 hours.

After the reaction, the reaction product was filtered through a glass filter and washed with hot water.

The resulting gel was filled in a column and a separation of the dextran standard sample was carried out. The limiting separable molecular weight was substantially the same with that of Example 6. The absorbing properties of the gel for the polyethyleneglycol standard sample and the protein standard were remarkably improved.

EXAMPLE 8

The gel having diameters of $8\mu-12\mu$ obtained in Example 1 was washed with dimethylformamide.

In a glass reactor, 100 wt. parts of the diamethylformamide wetted cake of the gel, 300 wt. parts of dimethylformamide, 30 wt. parts of glycerol diglycidyl ether (Danacol EX-314) and 2 wt. parts of potassium carbonate were charged and the mixture was stirred at 60° C. for 16 hours and then 100 wt. parts of 1 N-NaOH aqueous solution was added to the reaction mixture and the reaction was further carried out for 10 hours. After the reaction, the gel was filtered through a glass filter and washed with hot water and filled in a column. The protein standard sample was eluted with phosphoric acid buffer solution. As the result, all of proteins were eluted in orders of molecular weights.

EXAMPLE 9

In a glass reactor, 100 wt. parts of water wetted chake of the gel having diameters of $20\mu-30\mu$ obtained in Example 2, 200 wt. parts of 1 N-NaOH aqueous solution, and 40 wt. parts of butadiene diepoxide were charged and the mixture was stirred at 25° C. for 10 hours and further stirred at 50° C. for 2 hours. After the reaction, the gel was treated by the conventional method.

The gel was packed in a column and the protein standard sample was eluted with phosphoric acid buffer solution. As the result, all of proteins were eluted without any adsorption.

In comparison with the result of Example 2, remarkable reduction of the adsorbing property was found. This fact shows the effect of the hydrophilic treatment.

EXAMPLE 10

In a glass reactor, 100 wt. parts of a water wetted cake of a gel having epoxy group and having diameters of $15\mu-20\mu$ obtained in Example 3, 200 wt. parts of 1N-NaOH aqueous solution and 50 wt. parts of ethyleneglycol diglycidyl ether (Denacol EX-811) were charged and the mixture was heated at 30° C. for 20 hours and further heated at 50° C. for 5 hours to react them.

The resulting gel was washed and backed in a column.

The polyethyleneglycol standard sample and the protein standard sample were respectively eluted. All of polyethyleneglycols and all of proteins were respectively eluted in orders of molecular weights.

In comparison with the result of Example 3, the gel obtained by the hydrophilic treatment in this example had improved mechanical strength and lower adsorbing property. The hydrophilic treatment was effective for increasing the mechanical strength and lowering the adsorbing property.

EXAMPLE 11

In accordance with the process of Example 7 except using the gel having diameters of $20\mu-30\mu$ obtained in Example 4, a hydrophilic treatment and a post-treatment were carried out. The resulting gel was packed in a column. The protein standard sample was eluted with phosphoric acid buffer solution. As the result, all of proteins were eluted without any adsorption.

In comparison with the result of Example 4, the effect of the hydrophilic treatment was remarkable.

EXAMPLE 12

In accordance with the process of Example 7 except using the gel having diameters of $8\mu-12\mu$ obtained in Example 1 and 50 wt. parts of epichlorohydrin as the oxiran compound, a reaction was carried out. The resulting gel was washed with hot water. A part of the gel was dried and a content of chlorine atom was measured by an elementary analysis and 8% chlorine content was found.

The remained gel was suspended in 300 wt. parts of 1N-NaOH aqueous solution and the mixture was stirred at 60° C. for 10 hours to hydrolyze the gel. The gel was washed with hot water and a part of the gel was dried and a content of chlorine atom was measured by an elementary analysis and 0.5% chloride content was found.

The resulting gel was packed in a column. The protein standard sample was eluted with phosphoric acid buffer solution. All of proteins were eluted without any adsorption in orders of molecular weights.

In comparison with the result of Example 1, the effect of the hydrophilic treatment was remarkably high.

EXAMPLE 13

The gel obtained in Example 5 was seived to collect the gel having diameters of $15\mu-20\mu$.

In 500 wt. parts of 3N-NaOH aqueous solution, 100 wt. parts of the water wetted cake of the gel was suspended and the gel was hydrolyzed at 40° C. for 16 hours.

The resulting gel was washed with hot water and then, 50 wt. parts of glycerol diglycidyl ether (Denacol EX-314) and 200 wt. parts of 1N-NaOH aqueous solution were added and the mixture was stirred at 30° C. for 16 hours to perform the hydrophilic treatment.

The resulting gel was washed with hot water and packed in a column under high pessure. The gel had high enough mechanical strength to pack it easily.

As shown in Example 5, the gel which is not treated by the hydrophilic treatment was soft, whereby it is difficult to pack it in the column. Thus, the effect for increasing the mechanical strength by the hydrophilic treatment was remarkable.

The protein standard sample was eluted with phosphoric acid buffer solution. All of proteins were eluted without any adsorption. The adsorbing property was lowered in comparison with the gel which is not treated by the hydrophilic treatment.

Figure 1:
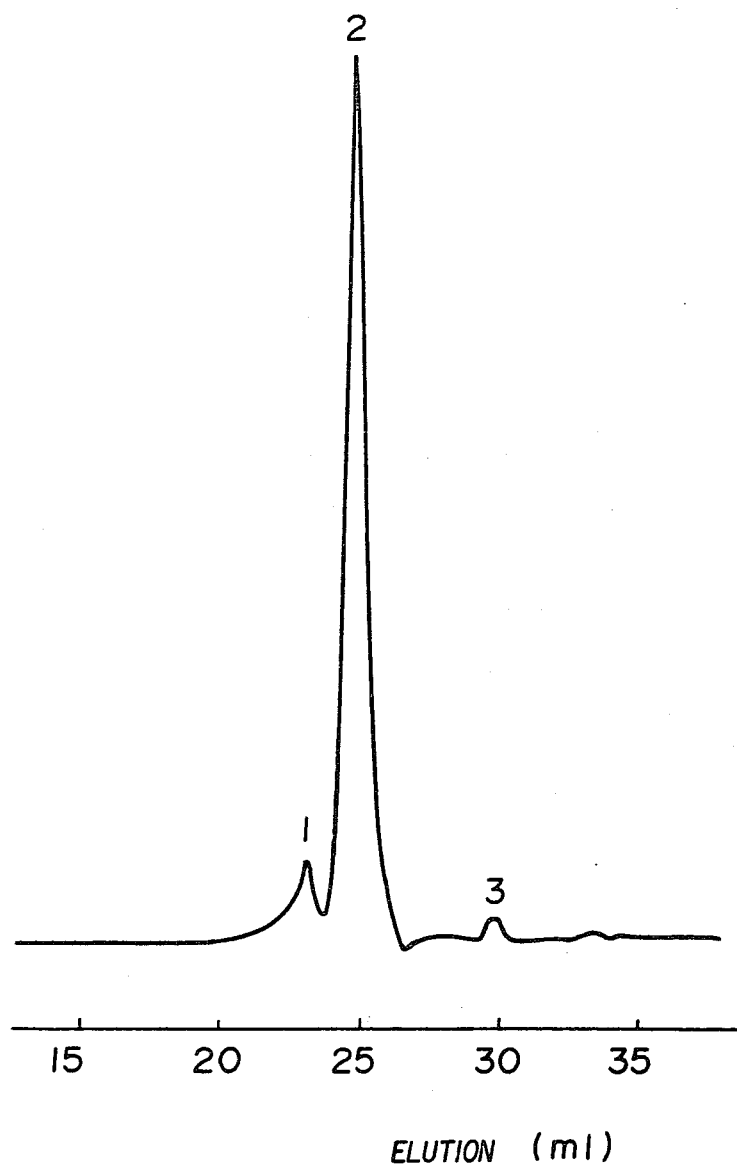
FIG. 1 shows the result of analysis of pentaerythritol dimethacrylate obtained by the process of Reference, by the high speed liquid chromatography.
Figure 2:
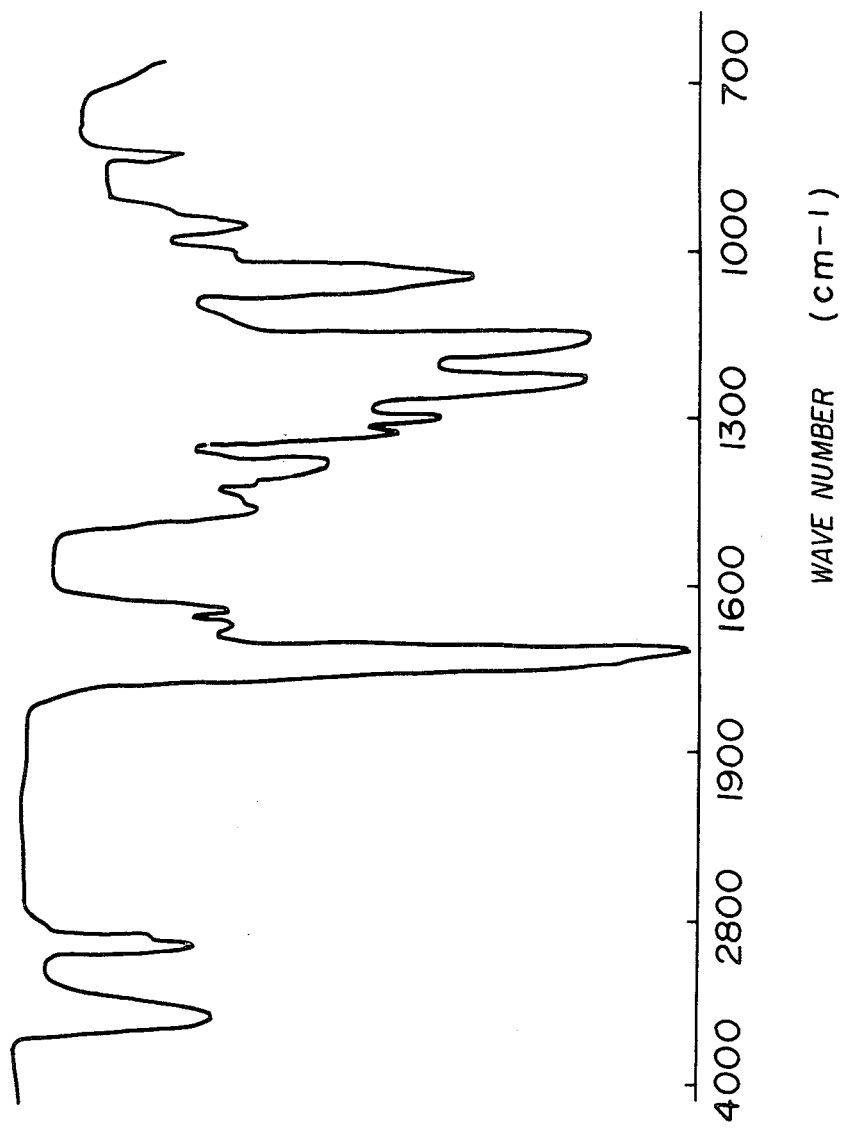
FIG. 2 shows IR spectrum of pentaerythritol dimethacrylate obtained by the process of Reference.
Figure 3:
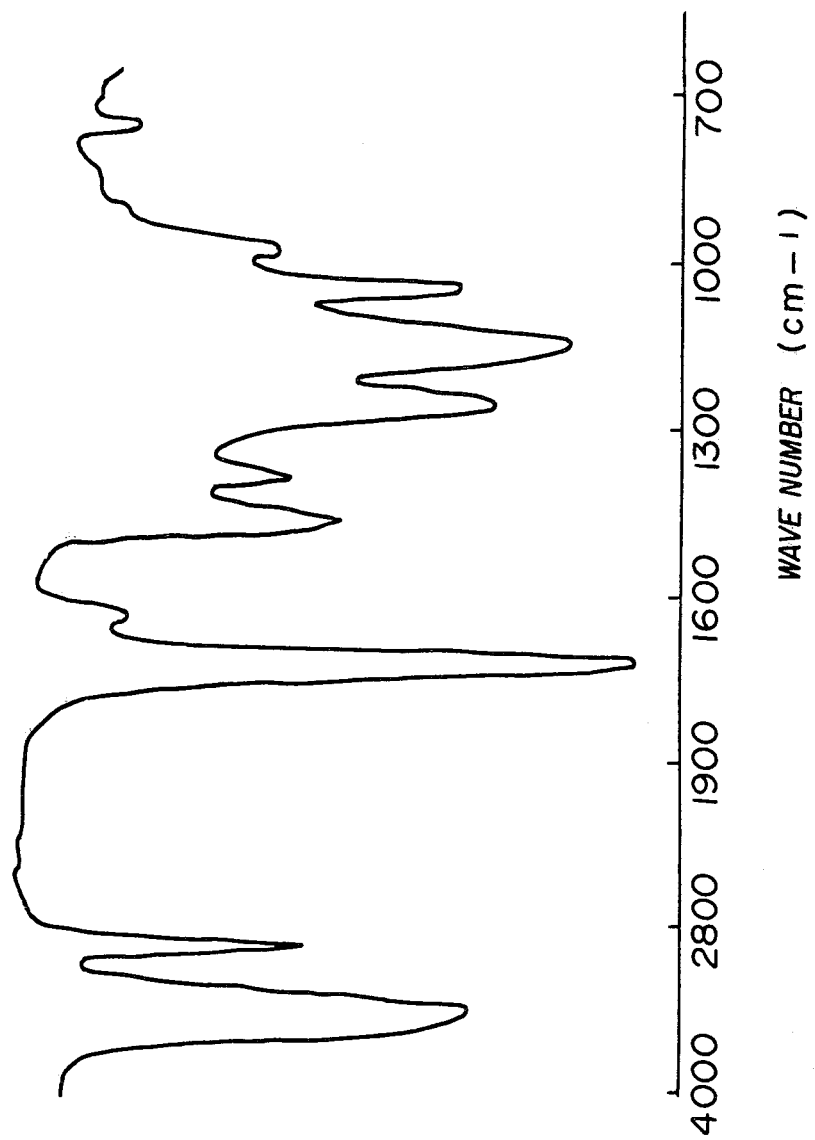
FIG. 3 shows IR spectrum of the porous spherical gel obtained in Example 1.
Figure 4:
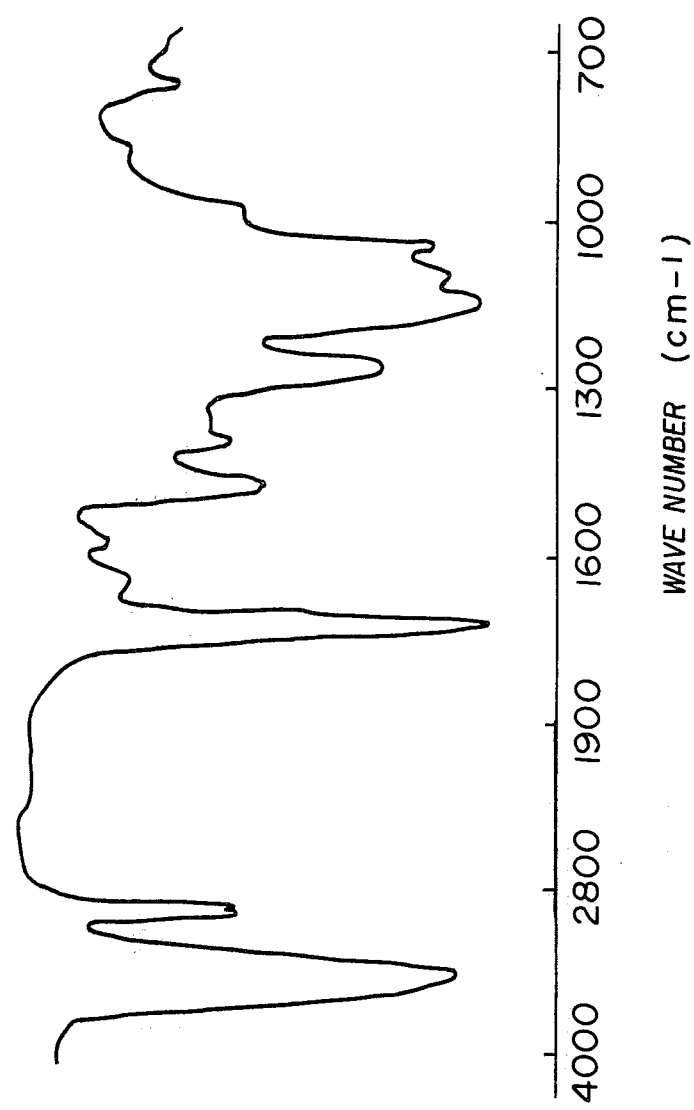
FIG. 4 shows IR spectrum of the porous spherical gel obtained in Example 6.
Figure 5:
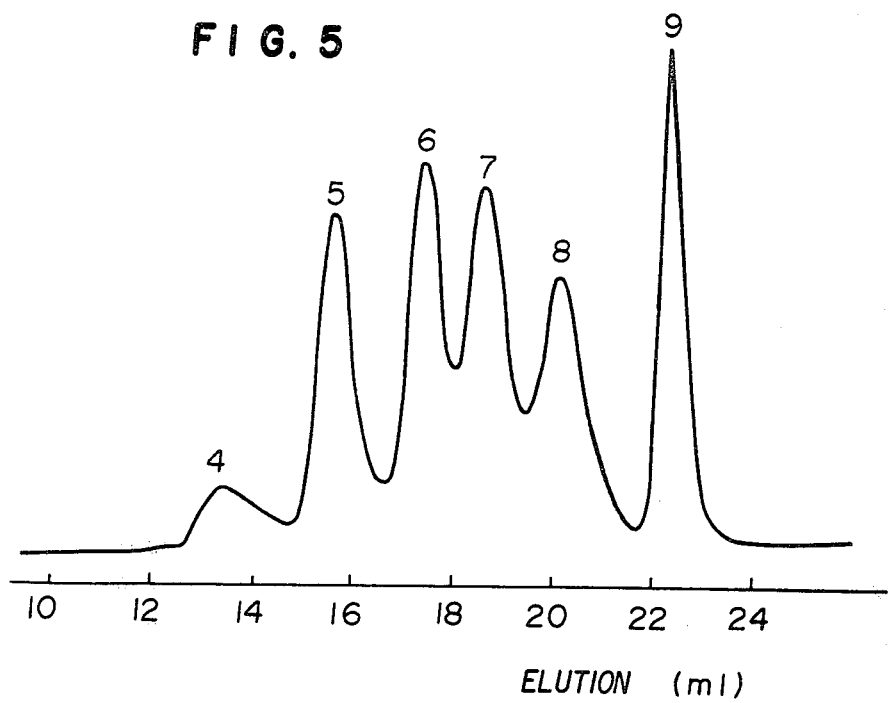
FIG. 5 shows the results of elution of the polyethyleneglycol standard sample by using the porous spherical gel obtained in Example 6 packed in the column.
Figure 6:
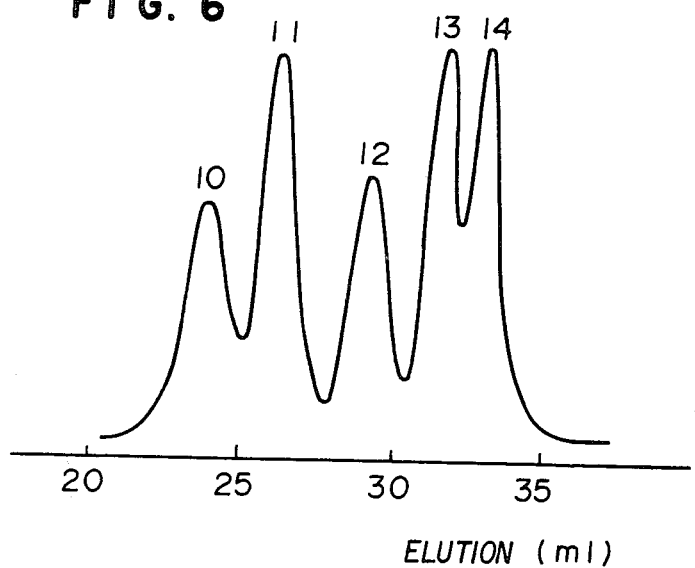
FIG. 6 shows the results of elution of the protein standard sample by using the porous spherical gel obtained in Example 6 packed in the column. The components were eluted without any adsorption in orders of molecular weights thereof.

1. pentaerythritol trimethacrylate;
2. pentaerythritol dimethacrylate;
3. glycidyl methacrylate;
4. polyethyleneglycol 20,000;
5. polyethyleneglycol 6,000;
6. polyethyleneglycol 4,000;
7. polyethyleneglycol 1,000;
8. polyethyleneglycol 600;
9. polyethyleneglycol 200;
10. γ-globulin
11. albumin (blood serum)
12. β-lactoglobulin
13. myoglobin
14. cytochrome C.

What is claimed is:

1. A hydrophilic separating carrier obtained by reacting a hydrophilic oxirane compound or its oligomer by an addition reaction on primary hydroxyl group of a porous spherical gel obtained by an aqueous suspension homopolymerization of pentaerythritol dimethacrylate or an aqueous suspension copolymerization of pentaerythritol dimethacrylate and a methacrylate monomer having hydrophilic group and/or hydrophilic convertible group or a porous spherical gel obtained by hydrolyzing said gel.

2. A process for producing a hydrophilic separating carrier which comprises reacting a hydrophilic oxirane compound or its oligomer, in a solvent in the presence or absence of a catalyst by an addition reaction, on primary hydroxyl group of a porous spherical gel obtained by an aqueous suspension homopolymerization of pentaerythritol dimethacrylate or an aqueous suspension copolymerization of pentaerythritol dimethacrylate and a methacrylate monomer having hydrophilic group and/or hydrophilic convertible group, or a porous spherical gel obtained by hydrolyzing said gel.

* * * * *